March 14, 1950     P. J. HERBST     2,500,545
AIR TRAFFIC CONTROL

Filed Nov. 20, 1947     3 Sheets-Sheet 1

*Inventor:*
*Philip J. Herbst*

By J. L. Whittaker
*Attorney*

March 14, 1950 P. J. HERBST 2,500,545
AIR TRAFFIC CONTROL
Filed Nov. 20, 1947 3 Sheets-Sheet 2
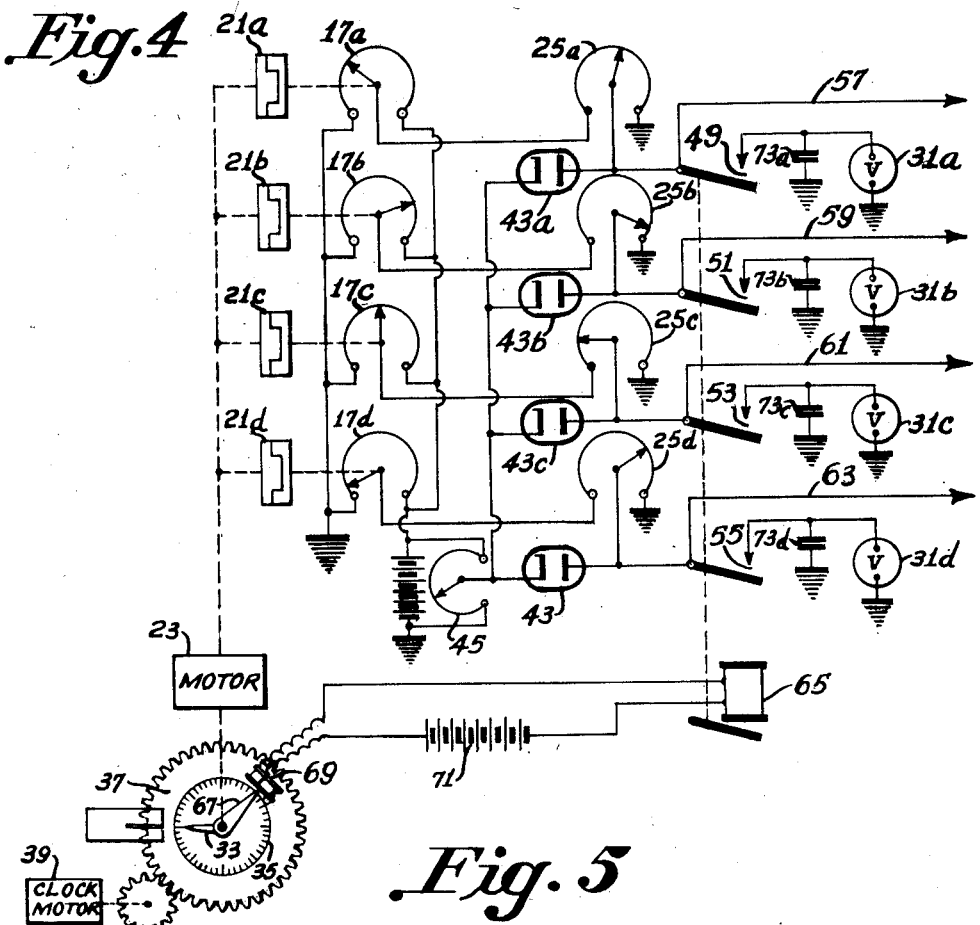
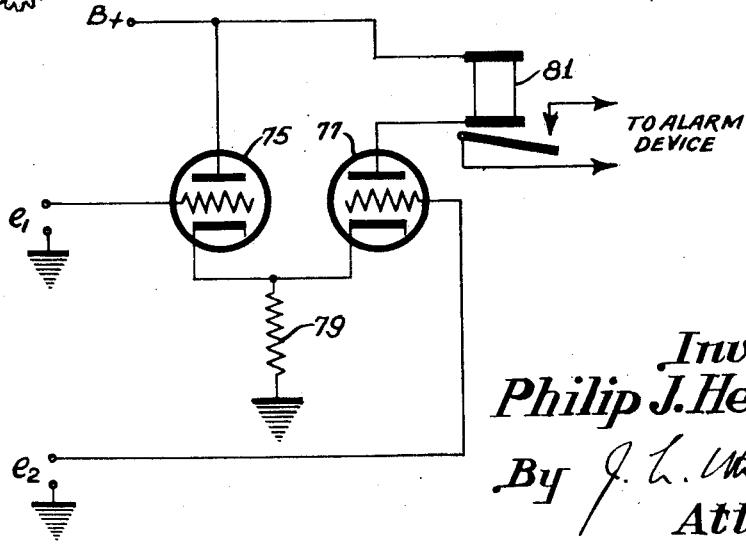
Inventor:
Philip J. Herbst
By J. L. Whittaker
Attorney

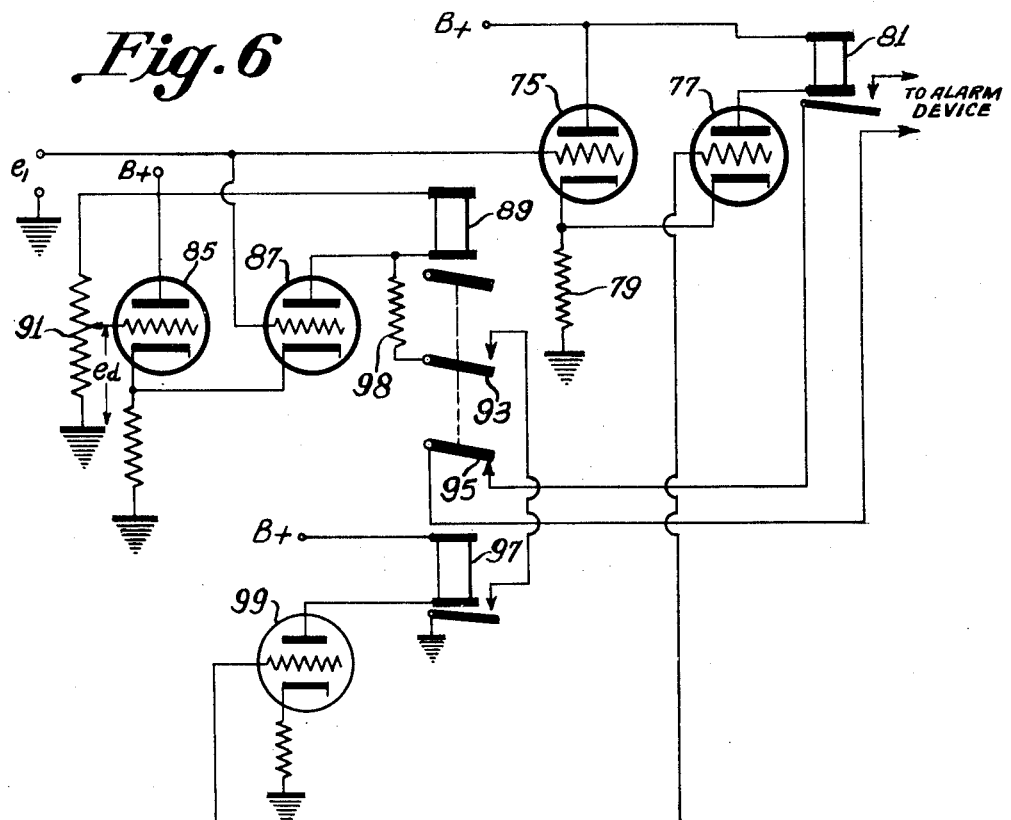
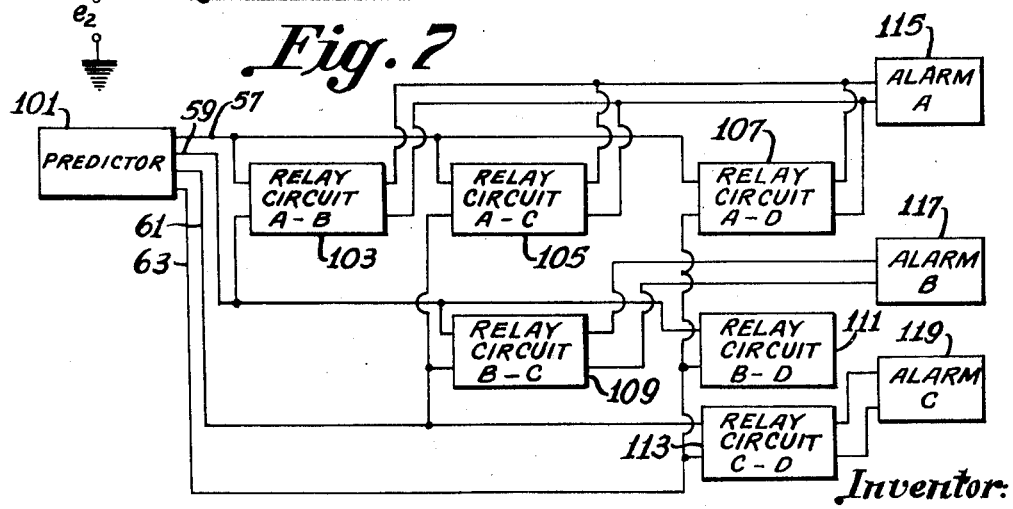

Patented Mar. 14, 1950

2,500,545

UNITED STATES PATENT OFFICE 2,500,545

AIR TRAFFIC CONTROL

Philip J. Herbst, Princeton, N. J., assignor to Radio Corporation of America, a corporation of Delaware Application November 20, 1947, Serial No. 787,128

6 Claims. (Cl. 235—61)

1

Figure 1:
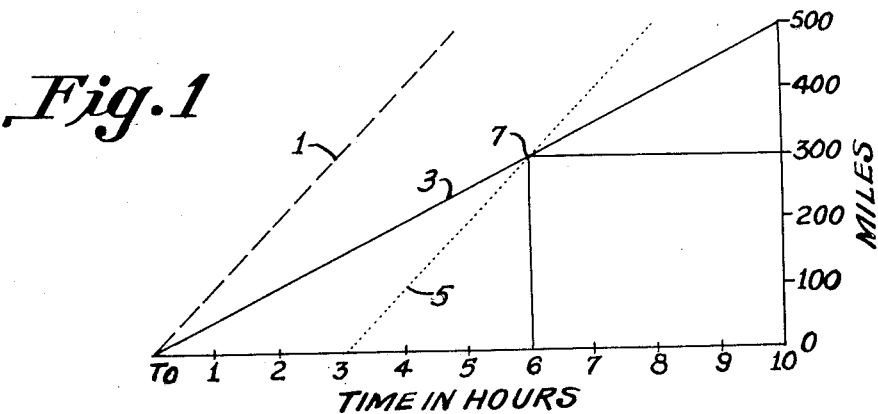

This invention relates to air traffic control, and its object is to provide systems for predicting possible or impending conflicts, i. e., unsafe proximity between any of a plurality of vehicles, such as aircraft travelling along a single path. The invention will be described with reference to the accompanying drawings, wherein:

Figure 1 is a graph illustrating the relationships between time and the distances from a check point of a plurality of aircraft flying a common course.

Figure 2:
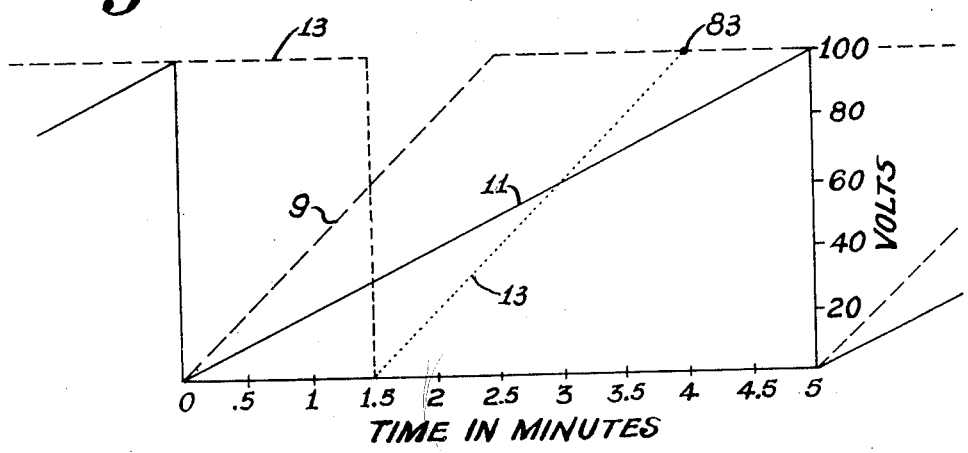
Figure 3:
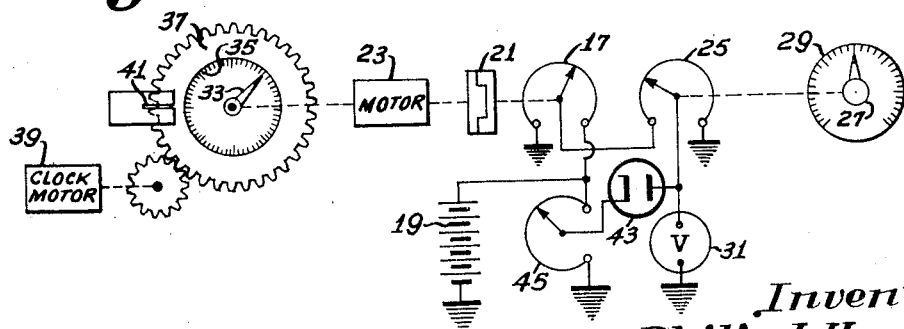

Figure 2 is a graph showing a plurality of sawtooth shaped voltage waves which correspond to the respective aircraft motions depicted in Figure 1, Figure 3 is a schematic diagram of an apparatus for producing a wave of the type shown in Figure 2, Figure 4 is a schematic diagram of a system comprising a plurality of devices like that of Figure 3, each for representing the flight of a respective aircraft, and means for showing the present positions along the airway of said craft as predicted from data as to their positions at some former time.

Figure 5 shows a circuit for energizing a relay upon the attainment of equality between two input voltages, Figure 6 is a modification of Figure 5, including further relay means for preventing false operation of the circuit when used with cyclical voltages like those produced by the system of Figure 4, and Figure 7 is a block diagram illustrating the connections of a plurality of relay circuits like that of Figure 6 to effect alarm upon prediction by the system of Figure 4 of a conflict between any two of a plurality of aircraft following a common path.

The scheduling of traffic along an airway is essentially the problem of preventing possible conflicts, taking into consideration the ground speeds and times of departure of the aircraft from their respective starting points. Consider a path 500 miles long, and assume that aircraft are to start at one end and fly continuously to the other end. Referring to Figure 1, the flight of an airplane starting at the present time $T_0$, and flying 100 miles per hour, is illustrated by the dash line 1. A second craft flying 50 miles per hour and starting substantially at the time $T_0$ (practically a few minutes later) is represented by the solid line 3. It is apparent that the slower craft may be dispatched immediately after the faster one, because the distance between them increases continuously.

2

Now suppose another airplane flying 100 miles per hour is started three hours later. As shown by the dotted line 5 of Figure 1, it will overtake the craft going 50 miles per hour at 300 miles from the starting point. The intersection 7 of the lines 3 and 5 indicates a conflict which must be avoided, as by delaying the departure of the third aircraft by two hours, or by the assignment of an alternative path to the overtaking aircraft.

According to the present invention conflicts of the type shown in Figure 1 are predicted by comparing electrical voltages which vary with respect to each other in the same manner as the distances of the various aircraft from the starting point or a check point vary with respect each other, but at a much more rapid rate. If, during a cycle of voltage changes corresponding to the complete journeys of all the aircraft over the common path, any one of the voltages becomes equal to any other, a potential collision is indicated.

Referring to Figure 2, it is assumed that one volt corresponds to five miles, and that one minute of predictor operation represents two hours actual time. A voltage varying as shown by the dash line 9 represents the flight of a craft starting at time $T_0$. The voltage changes at the rate of 40 volts per minute, corresponding to a speed of 100 miles an hour. Similarly, a voltage varying as shown by the solid line 11 represents the flight of an aircraft at 50 miles per hour, starting also at present time $T_0$, and a voltage varying like the dotted line 13 corresponds to a third craft leaving 3 hours later at 100 miles per hour. It is apparent that at the end of three minutes of voltage variation, the two latter voltages become equal, indicating a conflict between the corresponding aircraft. The voltage, 60 volts, represents a distance of 300 miles from the check point, and the time, 3 minutes, corresponds to an actual time of 6 hours from present time.

Figure 3 shows an apparatus for producing a voltage which varies like those shown in Figure 2. A variable voltage divider 17 is connected across a D.-C. source 19, and is mechanically coupled through a disengageable clutch 21 to a motor 23. The variable voltage output of the voltage divider 17 is applied to a second voltage divider 25, which is manually adjustable by means of a knob 27. The knob 27 carries a pointer over a scale 29. The output of the voltage divider 25 may be indicated by a voltmeter 31. The voltmeter 31 may be calibrated in units of distance, such as miles, and the scale 29 may be calibrated in units of speed, such as miles per hour.

The motor 23, in addition to driving the voltage divider 17, rotates a pointer 33 over a scale 35. The scale 35 is calibrated in time (hours) and the pointer 33 is rotated at a rate corresponding to the desired time scale factor, for example two hours per minute. A further scale 37, also calibrated in hours, surrounds the scale 35 and is rotated coaxially therewith by a clock motor 39. The scale 37 rotates to indicate actual time, i. e. one hour per hour, against a fixed index mark 41.

The adjustment and operation of the apparatus of Fig. 3 is as follows:

The voltage divider 25 is set to a position corresponding to the ground speed of the aircraft, as indicated on the scale 29. The clutch 21 is disengaged and the voltage divider 17 is set to make the voltmeter 31 indicate zero. The motor 23 drives the pointer 33 continuously over the scale 35. When the pointer 33 indicates the departure time of the aircraft, the clutch 21 is engaged. The voltage at the movable tap of the voltage divider 17 increases, owing to its rotation by the motor 23, at a rate which depends on the motor speed and the voltage of the source 19. The motor speed is such as to drive the voltage divider 17 through its entire range of adjustment in, say five minutes. The voltage of the source 19 is several times that corresponding to the total length of the airpath under consideration. The rate of change of voltage at the tap of the voltage divider 17 corresponds to a speed equal to or in excess of the maximum ground speed of any aircraft whose flight is to be represented. The output voltage of the voltage divider 25 increases at a slower rate corresponding to the aircraft speed as set in by the knob 27. The predicted distance of the craft from its starting point, at any time T as indicated by the pointer 33 on the dial 35, is shown by the voltmeter 31.

The adjustment of the voltage divider 17 is not necessarily made with reference to the departure of the craft from its starting point, as described above, but may be referred to the time when the craft appears at some intermediate check point. In this case, the voltage divider 17 is set, with the clutch 21 disengaged, to make the meter 31 indicate the distance of the check point (or some other reference point) from the starting point and the clutch is engaged when the pointer 33 indicates the time the craft is at the check point.

The apparatus then operates to predict future positions of the craft in the same manner as before, except that the effects of any deviations from the estimated ground speed before the craft arrived at the check point have been eliminated. Thus, by providing several check points over the length of the airway, corrections of the predicted flight can be made.

The clock motor 39 rotates the dial 37 according to actual time so that indications of the pointer 33 may be made with reference to present time $T_0$. For example, suppose the present time to be one o'clock and the aircraft is to arrive at some definite point two hours later. The pointer 33 will indicate this event as occurring at plus two hours from the present time $T_0$, or three o'clock. At two o'clock actual time, the same indication will be made at plus one hour from present time, still three o'clock.

The structure of the voltage divider 17 is such as to permit unlimited rotation in one direction, so that the above described operation is repeated cyclically with each complete rotation of the pointer 33. In order to prevent the voltmeter 31 from indicating predicted distances in excess of the length of the course, a voltage limiter may be provided across the output terminals of the voltage divider 25.

The limiter comprises a diode 43 with its anode connected to the movable tap of the voltage divider 25 and its cathode connected to the movable tap of a further voltage divider 45. The voltage divider 45 is connected across the source 19, and is adjusted so that the voltage at its tap corresponds to the total length of the airpath. As long as the output of the voltage divider 25 is less than this value, the diode 43 cannot conduct. However, when the output of the divider 25 becomes equal to that representing the overall length of the path, the voltage across the diode becomes essentially zero, and any further increase will be prevented by conduction through the diode. During a typical cycle of operation, the voltage applied to the meter 31 will increase, for example as shown by the line 9 in Fig. 2, to the value corresponding to the distance from start to finish of the airway. Thereafter it will remain constant until the end of the cycle, when it will return to zero and start over.

Referring to Fig. 4, a plurality of voltage dividers 17a, 17b, 17c and 17d are connected to a common D.-C. source 19. These voltage dividers are similar to the voltage divider 17 in Fig. 3, and are coupled through clutches 21a, 21b, 21c, and 21d respectively to the motor 23. Their outputs are applied to voltage dividers 25a, 25b, 25c and 25d respectively, which are provided with limiter diodes 43a, 43b, 43c and 43d. The voltage divider 45 controls the limiting level for all of the diodes. The voltage dividers 25a, 25b, 25c and 25d are each provided with a calibrated control means like the knob and dial 27 and 29 of Fig. 3, not shown in Fig. 4.

The outputs of the voltage dividers 25a, 25b, 25c, and 25d are applied to switches 49, 51, 53 and 55 respectively, and also to conductors 57, 59, 61 and 63. The switches 49, 51, 53 and 55 are mechanically ganged for operation by an electromagnet 65, closing when the magnet is energized.

The motor 23 drives the pointer 33 over the prediction time dial 35 as in the system of Fig. 3, and in addition drives a cam 67. A switch 69 is carried by the present time dial 37 in such position that it is momentarily closed by the cam 67 when the pointer 33 indicates present time. The switch 69 when closed energizes the electromagnet 65 from a source 71.

In the operation of the system of Fig. 4, the ground speeds of the various aircraft whose flights are to be followed are set in by adjustment of the voltage dividers 25a, 25b, 25c, and 25d. The voltage dividers 17a, 17b, 17c and 17d are each adjusted in accordance with the time of appearance of the respective aircraft over a check point, as described with reference to Fig. 3.

The output voltages on the conductors 57, 59, 61 and 63 vary cyclically to represent the flights of the respective craft. When the pointer 33 indicates present time, the switches 49, 51, 53 and 55 close to apply these voltages to the voltmeters 31a, 31b, 31c and 31d, which then indicate the present distances of the corresponding craft from the reference point. Capacitors 71a, 71b, 71c, and 71d are provided to integrate the voltages to some extent so that the voltmeters will hold their readings for a period of convenient length for observation. The conductors 57, 59, 61 and 63 may also be connected directly to another set of voltmeters, not shown, to continuously indicate predicted distances in the same manner as the voltmeter 31 in Fig. 3. To provide an alarm when the predicted positions of any two aircraft become the same, the conductors 57, 59, 61 and 63 may be connected to a system of relays which close corresponding circuits when any two of the voltages become equal.

Referring to Fig. 5, two voltages $e_1$ and $e_2$ are applied to the control grids of a pair of tubes 75 and 77 respectively. The tubes are provided with a common cathode resistor 79. The anode of the tube 75 is connected directly to the positive terminal of a "B" supply source, and the winding of a relay 81 is included in the anode circuit of the tube 77.

Suppose the voltage $e_1$ increasing with time like the voltage represented by the line 11 in Fig. 2, to be applied first to the tube 75.

At some subsequent time let the voltage $e_2$, also increasing, be applied to the tube 77. As long as $e_1$ is greater than $e_2$, the tube 75 will act like a cathode follower, i. e. the cathode will be at substantially the same potential $e_1$ as the control grid. Since this is greater than $e_2$, the cathode of the tube 77 will be positive with respect to its control grid, and no conduction will occur through the tube 77.

Now assume that $e_2$ is increasing more rapidly than $e_1$. When $e_2$ becomes substantially equal to or slightly greater than $e_1$, the conditions of the two tubes are interchanged; the tube 77 conducts and the tube 75 is cut off. The relay 81 closes, and remains closed as long as $e_2$ exceeds $e_1$.

It will be observed that the several voltage waves produced by the system of Fig. 4 are cyclical, and all have the same repetition period. They are not cophasal, however, since the starting times of the various aircraft they represent are not coincident. Moreover, as each reaches its maximum value, it becomes equal to any others which have attained that value at some earlier time. Thus, if a number of circuits like that of Fig. 5 were used for comparing the pairs of outputs from the system of Fig. 4, the relay 81 in each case would be closed at times when in fact no conflict impended. Under the conditions represented in Fig. 2, for example, the waves 9 and 13 become equal at the point 83, although no conflict exists between the corresponding aircraft since one arrives three hours ahead of the other. Also, the trailing portion of the wave 13, shown at the left side of Fig. 2, overlaps and exceeds the initial portions of the waves 9 and 11 up to its starting time at 1.5 minutes.

To avoid the false indications of conflict which otherwise would be occasioned by the cyclical nature of the operation of the predictor system, it is necessary to lock out or prevent the operation of a relay circuit such as that of Fig. 5 from the instant either of the input voltages applied to it reaches the value corresponding to arrival of an aircraft at the destination until after both of the input voltages have returned to zero and started to increase again.

Referring to Fig. 6, the tubes 75 and 77 are controlled by the voltages $e_1$ and $e_2$ as in Fig. 5 to close the relay 81 whenever $e_2$ equals or exceeds $e_1$. A similar circuit, including tubes 85 and 87, compares the voltage $e_1$ with a bias voltage $e_d$ to energize a relay 89 when $e_1$ equals $e_d$. The voltage $e_d$ is provided by a voltage divider 91 and is adjusted to the value corresponding to the overall length of the airway. This is the same as the limiting level set by the voltage divider 45 in Fig. 4, and if desired the bias $e_d$ may be taken directly from the voltage divider 45.

The relay 89 includes two sets of contacts 93 and 95. The contacts 95 are connected in series with those of the relay 81, and open when the relay 89 is energized. The contacts 93 close when the relay 89 is energized to establish a holding circuit through the contacts of a further relay 97 and a current limiting resistor 98. The relay 97 is connected to a tube 99 controlled by the input $e_2$, and is energized to close whenever $e_2$ is greater than zero.

In the operation of the circuit of Fig. 6, the contacts 95 remain closed as long as $e_1$ is less than $e_d$. The voltage $e_2$ starts to increase from zero after $e_1$ has started. If $e_2$ increases more rapidly than $e_1$, it will approach $e_1$ and may equal or exceed $e_1$ before $e_1$ reaches $e_d$. In this event, the relay 81 closes to energize an alarm circuit through the contacts 95 of the relay 89.

However, if $e_1$ reaches $e_d$ before $e_2$ overtakes $e_1$, the relay 89 operates first to open the contacts 95 and prevent actuation of the alarm. At the same time, the contacts 93 close to provide energization of the relay 89 through the contacts of the relay 97. Thus the relay 89 holds the contacts 95 open as long as the relay 97 remains closed. This situation continues after $e_1$ has returned to zero and continues until $e_2$ returns to zero, allowing the relay 97 to open. Thus the alarm circuit can be closed only when $e_2$ overtakes $e_1$ while both are increasing, which is the only condition corresponding to an actual conflict between aircraft.

Referring to Fig. 7, the entire apparatus shown in Fig. 4 is represented by the block 101. The output leads 57, 59, 61 and 63 are connected in pairs to the inputs of relay circuits 103, 105, 107, 109, 111 and 113, each of the relay circuits being of the type shown in Fig. 6. The output terminals of the relay circuits 103, 105, and 107 are connected in parallel with each other to an alarm device 115. Relay circuits 109 and 111 are similarly connected to an alarm device 117, and the relay circuit 113 is connected to an alarm device 119. Separate alarm devices, not shown, may be connected to the relay circuits individually if desired.

Designating the aircraft whose flights are represented by the voltages on the leads 57, 59, 61 and 63 as A, B, C and D respectively, the relay circuit 103 will close whenever a conflict is set up in the predictor between aircraft A and B. Similarly, a conflict between A and C or between A and D will close the relay 105 or the relay 107. Any conflict involving the craft A will actuate the alarm 115. In the same manner, any conflict involving B (but not A) will operate the alarm 117, and any conflict involving C, but not any previously scheduled craft (A or B) will operate the alarm 119.

In order for the system to work properly, the first scheduled craft, i. e. the first in order along the airway, must be set into channel A of the predictor, the second into channel B, and so on. When the first craft A has arrived at its destination further craft may be handled by moving craft B up into the first channel, C into the second, etc. It will be apparent that the system can be extended, by mere multiplication of the apparatus described, to provide any required number of channels.

I claim as my invention:

1. A system for predicting impending conflicts between vehicles scheduled to traverse a common path, including means providing a plurality of voltage waves, each corresponding to the motion of one of said vehicles and each increasing linearly as a function of time in accordance with the speed of the respective vehicle; means for initiating each voltage wave at an instant corresponding to the presence of the respective vehicle at a selected check point on said common path, and means indicating the instantaneous magnitudes of said voltage waves.

2. A system for predicting impending conflicts between aircraft scheduled to fly a common airway, including means providing a plurality of voltage waves, each corresponding to the motion of one of said aircraft and each increasing linearly as a function of time in accordance with the airspeed of the respective craft; means for initiating each voltage wave at an instant corresponding to the presence of the respective craft at a selected check point on said airway, and means responsive to the instantaneous equality of any two of said voltages to effect an alarm.

3. The invention as set forth in the foregoing claim, wherein said voltage waves are repetitive, including means for preventing said last mentioned means from effecting said alarm except when said two of said voltages are both increasing.

4. A system for predicting impending conflicts between aircraft scheduled to fly a common airway, including a voltage source, a plurality of variable voltage dividers connected across said source; means for driving all of said voltage dividers, a plurality of disengageable clutches, each coupling one of said voltage dividers to said driving means, and means indicating the position of said driving means in terms of predicted time; a further group of voltage dividers, and means applying the output of each one of said first-mentioned voltage dividers to a respective one of said last-mentioned group, means indicating the position of each of said last-mentioned group of voltage dividers in terms of ground speed of a corresponding aircraft, and means indicating equality of the output voltages of any two of said last-mentioned voltage dividers.

5. A system for predicting impending conflicts between aircraft scheduled to fly a common airway, including a voltage source, a plurality of variable voltage dividers connected across said source; means for driving all of said voltage dividers at the same rate, a plurality of disengageable clutches, each coupling one of said voltage dividers to said driving means, and means indicating the position of said driving means in terms of predicted time; a further group of voltage dividers, and means applying the output of each one of said first-mentioned voltage dividers to a respective one of said last-mentioned group, means indicating the position of each of said last-mentioned group of voltage dividers in terms of ground speed of a corresponding aircraft, and means responsive to equality of the output voltages of any two of said last-mentioned voltage dividers to effect an alarm.

6. A system for predicting impending conflicts between aircraft scheduled to fly a common airway, including a voltage source, a plurality of variable voltage dividers connected across said source; means for driving all of said voltage dividers in such direction as to increase their outputs, means coupling each of said voltage dividers to said driving means in a predetermined positional relationship to the others of said voltage dividers, according to the respective starting time of a corresponding aircraft and means indicating the position of said driving means in terms of predicted time; a further group of voltage dividers, and means applying the output of each one of said first-mentioned voltage dividers to a respective one of said last-mentioned group, means indicating the position of each of said last-mentioned group of voltage dividers in terms of ground speed of a corresponding aircraft, and means indicating equality of the output voltages of any two of said last-mentioned voltage dividers.

PHILIP J. HERBST.

REFERENCES CITED

The following references are of record in the file of this patent:

UNITED STATES PATENTS

| Number | Name | Date |
|---|---|---|
| 2,080,186 | Reymond | May 11, 1937 |
| 2,120,971 | Bailey | June 21, 1938 |
| 2,206,837 | Prince | July 2, 1940 |
| 2,344,761 | Wight et al. | Mar. 21, 1944 |
| 2,406,836 | Holden | Sept. 3, 1946 |
| 2,410,669 | Lynn | Nov. 5, 1946 |